(12) United States Patent
Diessner et al.

(10) Patent No.: US 10,706,291 B2
(45) Date of Patent: Jul. 7, 2020

(54) TRAILER ANGLE DETECTION SYSTEM FOR VEHICLE

(71) Applicant: MAGNA ELECTRONICS INC., Auburn Hills, MI (US)

(72) Inventors: Horst D. Diessner, Rochester Hills, MI (US); Jyothi P. Gali, Rochester Hills, MI (US); Nikhil Gupta, Brampton (CA); Hilda Faraji, Toronto (CA); Galina Okouneva, Markham (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 179 days.

(21) Appl. No.: 15/910,100

(22) Filed: Mar. 2, 2018

(65) Prior Publication Data

US 2018/0253608 A1    Sep. 6, 2018

Related U.S. Application Data

(60) Provisional application No. 62/474,644, filed on Mar. 22, 2017, provisional application No. 62/466,449, filed on Mar. 3, 2017.

(51) Int. Cl.
| | |
|---|---|
| *G06K 9/00* | (2006.01) |
| *G06K 9/46* | (2006.01) |
| *G06T 7/73* | (2017.01) |
| *B60R 1/00* | (2006.01) |
| *H04N 5/225* | (2006.01) |

(Continued)

(52) U.S. Cl.
CPC .......... *G06K 9/00791* (2013.01); *B60R 1/003* (2013.01); *G06K 9/4604* (2013.01); *G06K 9/4671* (2013.01); *G06T 3/0062* (2013.01); *G06T 7/60* (2013.01); *G06T 7/73* (2017.01); *H04N 5/2253* (2013.01); *B60R 2300/30* (2013.01); *G06K 9/627* (2013.01);

(Continued)

(58) Field of Classification Search
CPC .. G06K 9/00791; G06K 9/4671; G06K 9/627; G06K 9/4604; H04N 5/2253; H04N 5/2257; G06T 7/73; G06T 2207/30252; G06T 3/0062; G06T 7/60; G06T 2207/10024; B60R 1/003; B60R 2300/30
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Ming Y Hon
(74) *Attorney, Agent, or Firm* — Honigman LLP

(57) ABSTRACT

A trailer angle detection system for a vehicle towing a trailer includes a camera disposed at a rear portion of the vehicle and having a field of view rearward of the vehicle. The camera includes a two dimensional imager array having multiple rows and columns of photosensing elements. An image processor processes image data captured by the camera. With the vehicle towing a trailer, and via processing by the image processor of image data captured by the camera, the trailer angle detection system detects a portion of the trailer that is being towed by the vehicle. The trailer angle detection system determines, via processing by the image processor of image data captured by the camera, an angle of the trailer relative to the vehicle responsive to determination of which columns of photosensing elements sense the detected portion of the trailer in the field of view of the camera.

20 Claims, 6 Drawing Sheets

(51) Int. Cl.
*G06T 3/00* (2006.01)
*G06T 7/60* (2017.01)
*G06K 9/62* (2006.01)

(52) U.S. Cl.
CPC ............... *G06T 2207/10024* (2013.01); *G06T 2207/30252* (2013.01); *H04N 5/2257* (2013.01)

(56) References Cited

U.S. PATENT DOCUMENTS

| | | | |
|---|---|---|---|
| 5,949,331 A | 9/1999 | Schofield et al. | |
| 6,690,268 B2 | 2/2004 | Schofield et al. | |
| 7,038,577 B2 * | 5/2006 | Pawlicki | B60W 30/18 340/435 |
| 8,930,140 B2 | 1/2015 | Trombley et al. | |
| 9,085,261 B2 | 7/2015 | Lu et al. | |
| 9,296,422 B2 | 3/2016 | Lavoie | |
| 9,446,713 B2 | 9/2016 | Lu et al. | |
| 9,558,409 B2 | 1/2017 | Pliefke et al. | |
| 2008/0044061 A1 * | 2/2008 | Hongo | B60R 1/00 382/104 |
| 2009/0306474 A1 * | 12/2009 | Wilson | A61B 1/041 600/109 |
| 2012/0287232 A1 * | 11/2012 | Natroshvili | G06T 7/33 348/36 |
| 2013/0177237 A1 * | 7/2013 | Schamp | G06K 9/00805 382/154 |
| 2014/0085472 A1 * | 3/2014 | Lu | B60R 1/002 348/148 |
| 2014/0160276 A1 | 6/2014 | Pliefke et al. | |
| 2014/0267688 A1 * | 9/2014 | Aich | B60W 10/20 348/113 |
| 2015/0002670 A1 | 1/2015 | Bajpai | |
| 2015/0217693 A1 | 8/2015 | Pliefke et al. | |
| 2015/0253428 A1 * | 9/2015 | Holz | G01S 17/42 356/5.01 |
| 2015/0363936 A1 * | 12/2015 | Hallett | G06F 3/03545 382/106 |
| 2016/0309135 A1 * | 10/2016 | Ovsiannikov | H04N 5/23245 |
| 2017/0032210 A1 * | 2/2017 | Deppieri | G06K 9/34 |
| 2017/0050672 A1 | 2/2017 | Gieseke et al. | |
| 2017/0217372 A1 | 8/2017 | Lu et al. | |
| 2017/0254873 A1 | 9/2017 | Koravadi | |
| 2018/0215382 A1 | 8/2018 | Gupta et al. | |
| 2018/0276838 A1 | 9/2018 | Gupta et al. | |
| 2018/0276839 A1 | 9/2018 | Diessner et al. | |
| 2019/0016264 A1 | 1/2019 | Potnis et al. | |
| 2019/0039649 A1 | 2/2019 | Gieseke et al. | |
| 2019/0042864 A1 | 2/2019 | Pliefke et al. | |
| 2019/0064831 A1 | 2/2019 | Gali et al. | |
| 2019/0118860 A1 | 4/2019 | Gali et al. | |
| 2019/0143895 A1 | 5/2019 | Pliefke et al. | |

\* cited by examiner

Cylinder View Generation

The camera image shall be transformed into a cylinder or panoramic view as defined below:

- The cylinder view image shall cover a horizontal camera opening angle of 180 degrees.
- The horizontal opening angle of the camera shall the distributed linearly over the columns of the cylinder view image. This allows each column in the image (for example, the location of a trailer) to be directly converted into a trailer angle.

*For a resolution of 1280x800 pixels, this results that:*

- *the column 0 corresponds to a vertical plane at -90 degrees*
- *the column 319 corresponds to a vertical plane at -45 degrees*
- *the column 639 corresponds to a vertical plane at 0 degrees*
- *the column 959 corresponds to a vertical plane at +45 degrees*
- *the column 1279 corresponds to a vertical plane at +90 degrees*

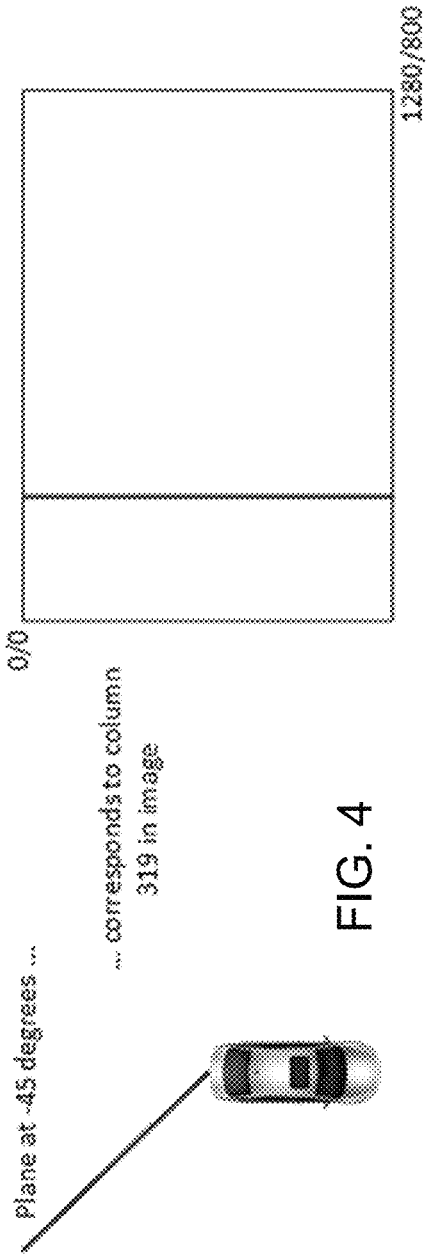

FIG. 4

Cylinder View Generation

- Each pixel of the same row in the cylinder view shall have same distance from the camera with Z=0. This allows that the trailer is shown with the same size in the image regardless of the trailer angle (size invariance).

*This results that each row corresponds to a circle projected on the ground (Z=0) in the OD_VehicleCoordinateSystem.*

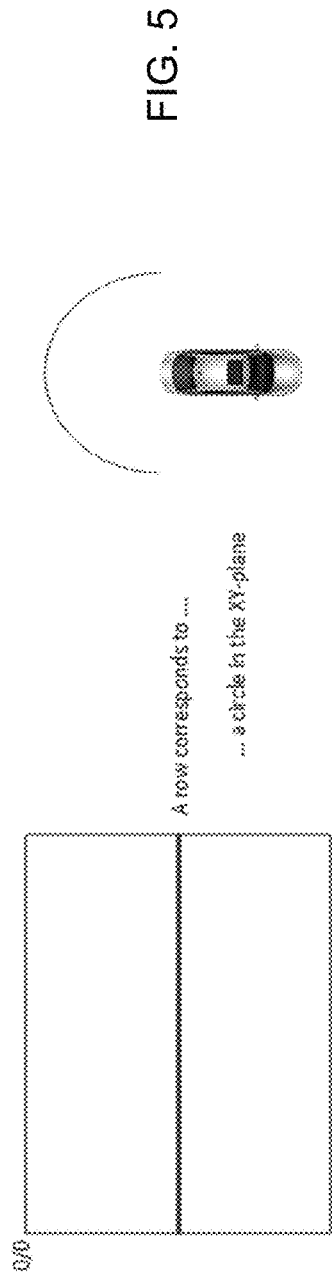

FIG. 5

- Objects located in the Detection Area at the same distance from the camera shall be size in-variant in cylinder view image. This allows that the trailer is shown with the same angle in the image regardless of the trailer angle (rotation invariance).

*Therefore, objects at the same distance from the camera occur with the same height and width and at the same row in the input image.*

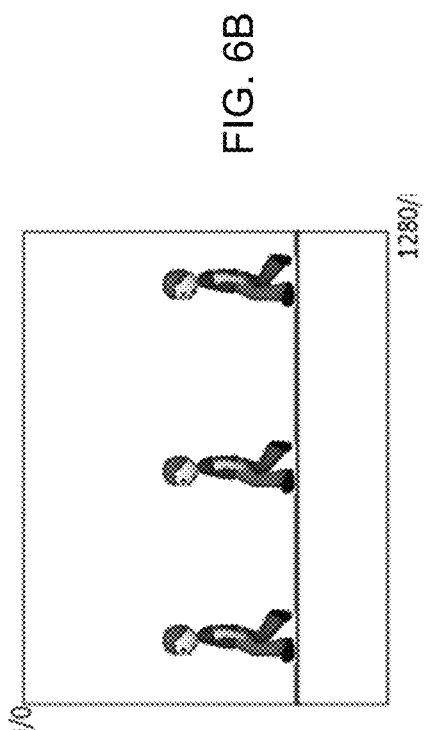

FIG. 6B

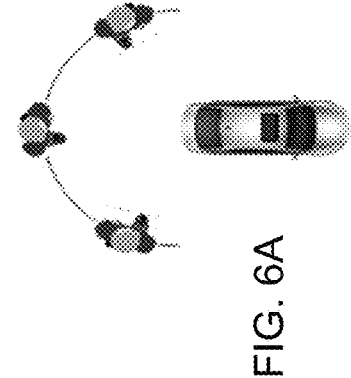

FIG. 6A

TRAILER ANGLE DETECTION SYSTEM FOR VEHICLE

CROSS REFERENCE TO RELATED APPLICATIONS

The present application claims the filing benefits of U.S. provisional application Ser. No. 62/474,644, filed Mar. 22, 2017, and Ser. No. 62/466,449, filed Mar. 3, 2017, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle to assist a driver of the vehicle in maneuvering the vehicle with a trailer.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

In some systems, when attaching a trailer to the vehicle, the driver has to enter its properties to put the trailer driving aid system into a position to properly calculate the driving aids overlays, when backing up with a trailer attached. Some more advanced systems are able to detect the trailer length and the distance of the trailer's axle to the hatch by watching the trailer's turning behavior when the vehicle and trailer are in motion using visual data processing such as described in U.S. Publication No. US-2014-0160276, which is hereby incorporated herein by reference in its entirety.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, with the vehicle towing a trailer, and with the system determining the angle of the trailer relative to the vehicle without need for a target disposed at the trailer and in the field of view of the vehicle camera. The system uses captured image data to generate a cylinder view, such that objects located in the camera's field of view that are at the same distance from the camera are constant size. With the cylinder view generated, trailer detection and angle calculation are performed to determine the trailer angle relative to the vehicle.

These and other objects, advantages, purposes and features of the present invention will become apparent upon review of the following specification in conjunction with the drawings.

BRIEF DESCRIPTION OF THE DRAWINGS

FIGS. 4 and 5 show cylinder view generation in accordance with the present invention;

FIGS. 6A and 6B show how objects located in the detection area at the same distance from the camera are shown in the same size in the cylinder view image.

DESCRIPTION OF THE PREFERRED EMBODIMENTS

Figure 1:
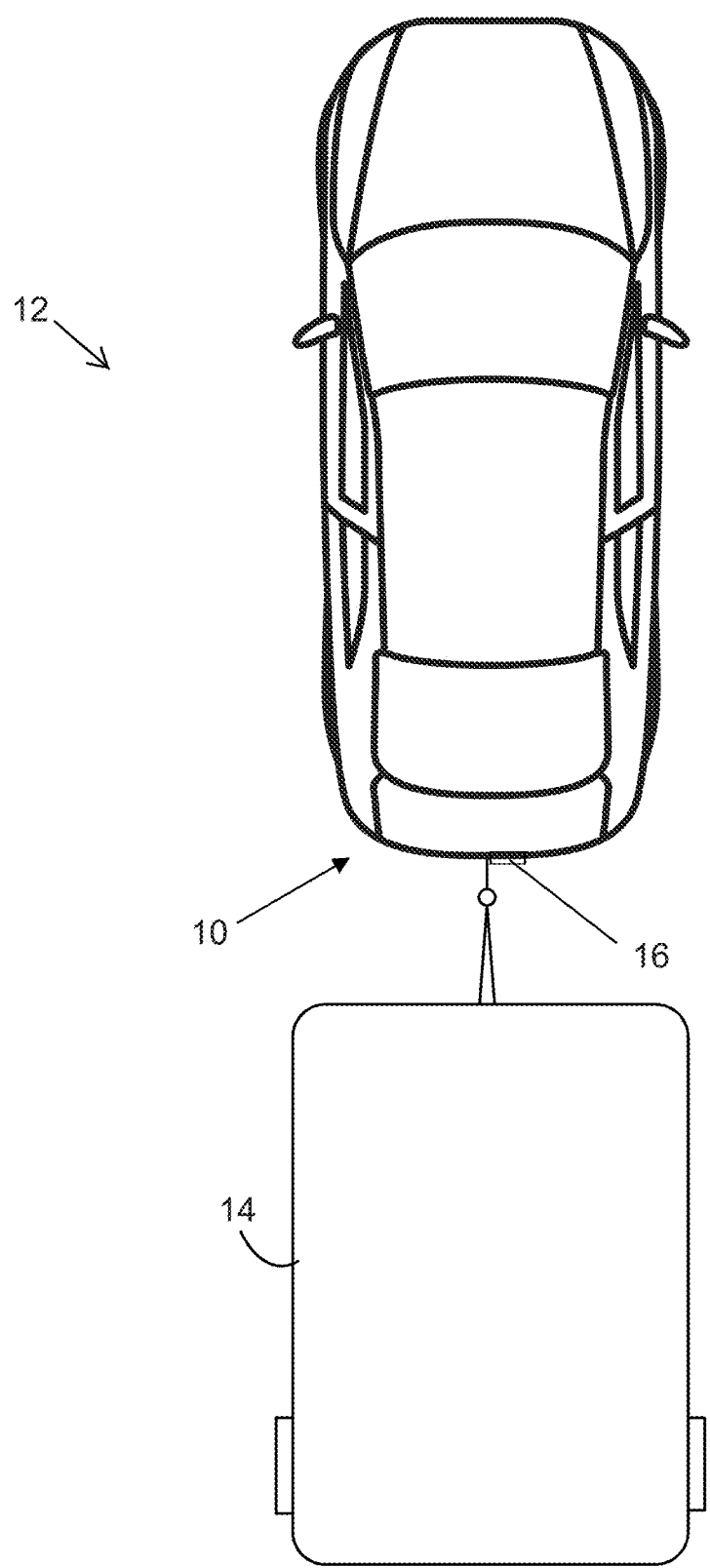
FIG. 1 is a plan view of a vehicle with a vision system that incorporates a camera for capturing image data representative of a trailer being towed by the vehicle.

Referring now to the drawings and the illustrative embodiments depicted therein, a rear vision system 10 for a vehicle 12 is operable to detect the angle of a trailer 14 that is pulled behind the vehicle 12 by using a rear view camera or multi-camera surround view system (FIG. 1). A camera 16 is mounted at the rear end portion of the pulling vehicle 12. An image processor (such as a digital processor or FPGA or DSP or ASIC or camera imager SOC or other suitable processor or processing means) is operable to process the image data captured by the camera and, responsive to such processing of captured image data, determines the angle of the trailer in relation to the pulling vehicle in real time. The system of the present invention is operable to determine the trailer angle as the vehicle is driven and turned, such as at corners or the like, along a road, as discussed below.

Figure 2:
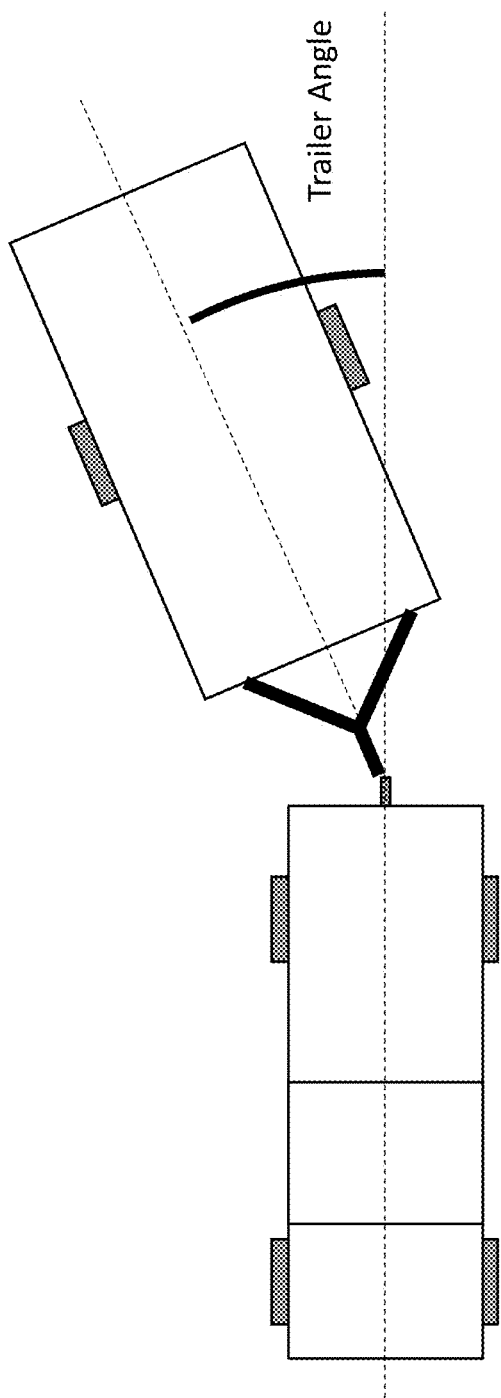
FIG. 2 is a plan view of the vehicle and trailer, showing the trailer angle of the trailer relative to the vehicle.

The system is operable to measure the angle (see FIG. 2) between a tow vehicle and trailer using the rear view camera. The system outputs an absolute trailer angle when the vehicle is stopped or moving. The system does not require user measurements and/or a target sticker attached to a trailer. The system may work with any type of conventional trailer such as utility trailer, travel trailer, loaded and unloaded boat trailer, snow mobile trailer, custom trailers or the like. The system functions independent of lighting conditions (such as, for example, day/night/sun/cloud/rain/snow) and road surfaces (such as, for example, concrete/asphalt/gravel/grass/dirt). The system may require an initial calibration where the vehicle is driving forward for less than 10 meters. However, no vehicle motion is preferred (no calibration). The system may output the trailer angle within 10 video frames captured after activation of the system.

Figure 3:
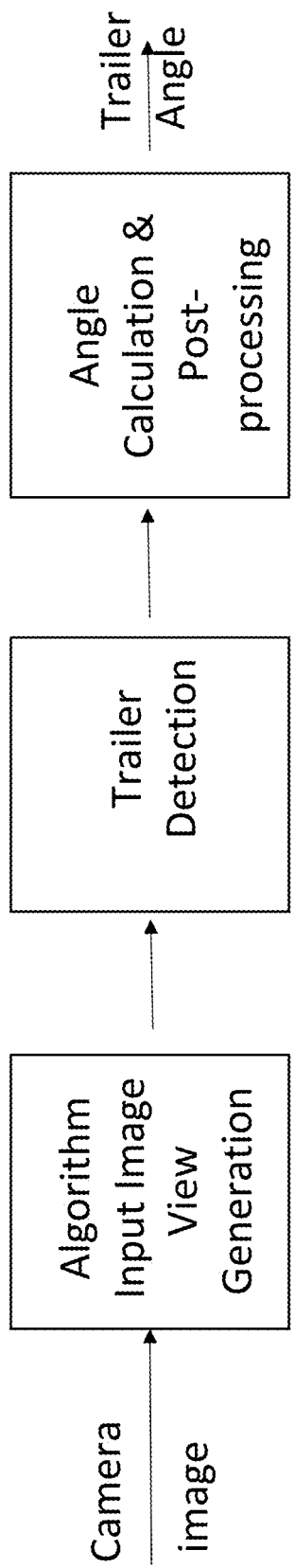
FIG. 3 is a block diagram of the target-less trailer angle detection algorithm of the present invention.

The algorithm for the target-less trailer angle detection system can be divided into the blocks shown in FIG. 3. As shown in FIG. 3, the camera captures image data, which is input into a cylinder view generation process or algorithm input image view generation, which outputs to a trailer detection process, which outputs to an angle calculation and post-processing step or process, which determines the trailer angle relative to the towing vehicle.

The algorithm input image generates image views for processing. In machine vision, it is preferred that the feature or object to be detected appears in the input image of the algorithm, with the feature or object being undistorted (with the appearance of the object being the same regardless of its location in the image), rotation invariant (with the orientation of the feature or object being the same regardless of its location in the image) and size invariant (with the size of the feature or object being the same regardless of its location, if the distance between the camera and the object is the same). In cases where the feature or object is undistorted and rotation and size invariant, the detection and/or classification of the object is less complex and more repeatable, resulting in a better detection performance (detection rate, detection accuracy, classification rate). A view transform may be developed to achieve an undistorted, rotation and size invariant object or trailer. A cylinder or panoramic view meets the algorithm input image requirements (undistorted, size and rotation invariance). Such a cylinder or panoramic view is similar to the pano-view photo functionality of the iPhone.

The rotation is difficult to handle in object detection since it is computationally expensive. Traditional object detection in the image is limited to pixel row and column, and is therefore two dimensional. In case rotation is not eliminated by the input image transform, a third dimension is added regarding the detection algorithm. Therefore, the number of iterations (or computations) is increased. The output of the detection algorithm would be pixel row, column and object angle.

With reference to FIG. 4, the camera image is transformed into a cylinder or panoramic view, where the cylinder view image covers a horizontal camera opening angle of 180 degrees. The horizontal opening angle of the camera is distributed linearly over the columns of the cylinder view image, such as shown in FIG. 4. This allows each column in the image (for example, the location of a trailer) to be directly converted into a trailer angle.

As shown in FIG. 5, each pixel of the same row in the cylinder view has the same distance from the camera if the corresponding 3D point has Z (height)=0. This allows that the trailer is shown with the same size in the image regardless of the trailer angle (size invariance). This results in each row corresponding to a circle projected on the ground (Z=0) in the vehicle coordinate system. Objects located in the detection area at the same distance from the camera shall be size invariant in a cylinder view image. This allows that the trailer front face is shown with the same angle in the image regardless of the trailer angle (rotation invariance). Thus, objects at the same distance from the camera occur with the same height and width and at the same row in the input image (see FIGS. 6A and 6B).

Figure 8:
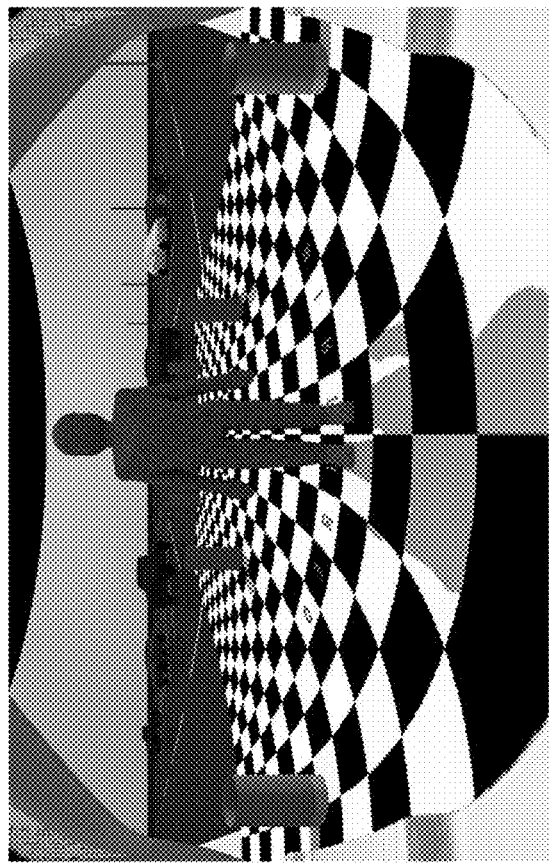
FIGS. 7 and 8 show examples of different camera view types.
Figure 7:
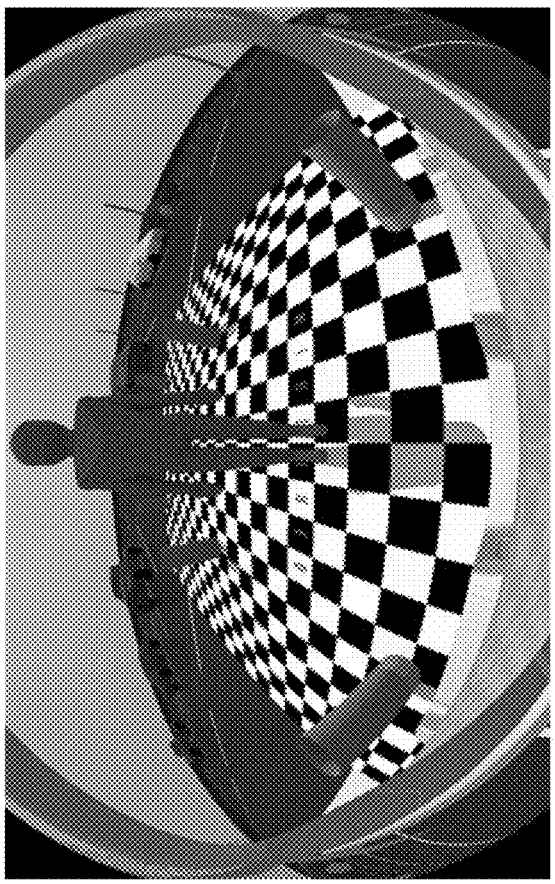

The cylinder view is configured such that the upper edge of the image is below the horizon and the bottom edge is beyond the tow ball showing the trailer tongue. In this case, the trailer moves without being rotated or resized from left to right or vice versa where the column corresponds to the trailer angle directly. FIGS. 7 and 8 show examples of cylinder views and panoramic views.

The intent of the trailer angle detection block is to locate the trailer position in terms of pixels and rows in the cylinder view image. It is preferred to choose an approach where the most amount of pixels of the trailer are used in the trailer detection. For example, utilizing edges results in more pixels being utilized than corners (1 pixel per corner). The cylinder view is configured so that the trailer hitch is always touching the bottom edge of the cylinder view image. This can be used in detecting the trailer. The Trailer Detection shall output the center line (column in cylinder view) of the trailer.

The trailer detection process includes detecting the trailer in the cylinder view using methods such as motion approach, where the vehicle is moving during a short calibration step (<10 m travel), and optical flow is utilized to perform a foreground/background segmentation and to initially locate or detect the trailer in the image. Edge detection is used to detect the outer edges of the trailer, and the outer edges are utilized to determine the center line of the trailer, with the points (such as all of the points) of the center line of the trailer being averaged together in order to detect the column of the trailer in the cylinder view image. The system may include or may be responsive to a level sensor of the vehicle and/or trailer so that the system determines when the trailer is vertically angled relative to the vehicle, so the system can adjust processing and determination of the location of the trailer portion accordingly.

Optionally, the trailer detection process may include neural network/deep learning, where the trailer is detected in the image using neural networks/deep learning algorithms, such that no initial calibration and/or vehicle motion is required to detect the trailer. A detailed trailer detection (for example using edges) is the same in the learning approach as in the motion approach.

The angle calculation/post processing includes using image processing to detect the outer edges of the trailer. The outer edges of the trailer are utilized to determine the vertical center line of the trailer in the cylinder view image. The vertical center line is used to calculate the trailer angle utilizing the dependency specified in FIG. 3. The trailer angle is filtered and conditioned in a post processing step.

The Angle calculation may be done using the center line of the trailer. The trailer angle is filtered and conditioned in a post processing step. Vehicle+Trailer kinematic models may be used to supplement the trailer angle calculation in order to overcome temporary dropouts. Kalman filtering or any other tracker may be used to stabilize the output. Average Filtering may not be used since it introduces a delay in the output.

The system may utilize aspects of the trailering or trailer angle detection systems described in U.S. Pat. Nos. 9,085,261 and/or 6,690,268, and/or U.S. Publication Nos. US-2017-0254873; US-2017-0217372; US-2017-0050672; US-2015-0217693; US-2014-0160276; US-2014-0085472 and/or US-2015-0002670, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailer angle detection system for a vehicle towing a trailer, said trailer angle detection system comprising:

a camera disposed at a rear portion of a vehicle and having a field of view exterior and rearward of the vehicle;

wherein said camera comprises a two dimensional imager array having multiple rows of photosensing elements and multiple columns of photosensing elements;

an image processor operable to process frames of image data captured by said camera;

wherein, with the vehicle towing a trailer, and via processing by said image processor of image data captured by said camera, said trailer angle detection system detects a portion of the trailer that is being towed by the vehicle;

wherein said trailer angle detection system generates a cylindrical view image based on a frame of image data captured by said camera, wherein the generated cylindrical view image comprises multiple rows of pixels and multiple columns of pixels, and wherein the generated cylindrical view image is generated by linearly distributing a horizontal camera opening angle of the camera over the columns of pixels; and wherein said trailer angle detection system determines an angle of the trailer relative to the vehicle responsive to determination of which columns of pixels the detected portion of the trailer appears at in the generated cylindrical view image.

2. The trailer angle detection system of claim 1, wherein the detected portion of the trailer is size invariant when located in different regions in the field of view of said camera.

3. The trailer angle detection system of claim 1, wherein an upper edge of the generated cylindrical view image is below the horizon and a lower edge of the generated cylindrical view image is below a hitch ball of the vehicle.

4. The trailer angle detection system of claim 1, wherein the detected portion of the trailer is at the same height and at the same row of pixels in the generated cylindrical view image when the trailer is at different angles relative to the vehicle.

5. The trailer angle detection system of claim 1, wherein the detected portion of the trailer is the same width and at the same row of pixels in the generated cylindrical view image when the trailer is at different angles relative to the vehicle.

6. The trailer angle detection system of claim 1, wherein the horizontal camera opening angle of said camera is linearly distributed over a single row of pixels in the generated cylindrical view image.

7. The trailer angle detection system of claim 1, wherein said trailer angle detection system performs an initial calibration when the vehicle is initially moved when towing the trailer.

8. The trailer angle detection system of claim 1, wherein said trailer angle detection system determines the angle of the trailer without use or detection of a target on the trailer.

9. The trailer angle detection system of claim 1, wherein said trailer angle detection system operates independent of lighting conditions.

10. The trailer angle detection system of claim 1, wherein said trailer angle detection system operates independent of road surfaces.

11. A trailer angle detection system for a vehicle towing a trailer, said trailer angle detection system comprising:
- a camera disposed at a rear portion of a vehicle and having a field of view exterior and rearward of the vehicle;
- wherein said camera comprises a two dimensional imager array having multiple rows of photosensing elements and multiple columns of photosensing elements;
- an image processor operable to process frames of image data captured by said camera;
- wherein, with the vehicle towing a trailer, and via processing by said image processor of image data captured by said camera, said trailer angle detection system detects a portion of the trailer that is being towed by the vehicle;
- wherein said trailer angle detection system generates a cylindrical view image based on a frame of image data captured by said camera, wherein the generated cylindrical view image comprises multiple rows of pixels and multiple columns of pixels, and wherein the generated cylindrical view image is generated by linearly distributing a horizontal camera opening angle of the camera over the columns of pixels;
- wherein an upper edge of the generated cylindrical view image is below the horizon and a lower edge of the generated cylindrical view image is below a hitch ball of the vehicle;
- wherein the detected portion of the trailer is size invariant when located in different regions in the field of view of said camera; and
- wherein said trailer angle detection system determines an angle of the trailer relative to the vehicle responsive to determination of which columns of pixels the detected portion of the trailer appears at in the generated cylindrical view image.

12. The trailer angle detection system of claim 11, wherein the horizontal camera opening angle of said camera encompasses a single pixel row in the generated cylindrical view image.

13. The trailer angle detection system of claim 11, wherein said trailer angle detection system performs an initial calibration when the vehicle is initially moved when towing the trailer.

14. The trailer angle detection system of claim 11, wherein said trailer angle detection system determines the angle of the trailer without use or detection of a target on the trailer.

15. A trailer angle detection system for a vehicle towing a trailer, said trailer angle detection system comprising:
- a camera disposed at a rear portion of a vehicle and having a field of view exterior and rearward of the vehicle;
- wherein said camera comprises a two dimensional imager array having multiple rows of photosensing elements and multiple columns of photosensing elements;
- an image processor operable to process frames of image data captured by said camera;
- wherein, with the vehicle towing a trailer, and via processing by said image processor of image data captured by said camera, said trailer angle detection system detects a portion of the trailer that is being towed by the vehicle;
- wherein the detected portion of the trailer is encompassed by a horizontal band of the field of view of said camera throughout a range of angles of the trailer relative to the vehicle;
- wherein the horizontal band of the field of view is encompassed by at least one linear row of pixels of said imager array of said camera;
- wherein the detected portion of the trailer is size invariant when located in different regions in the horizontal band of the field of view of said camera;
- wherein said trailer angle detection system generates a cylindrical view image based on a frame of image data captured by said camera, wherein the generated cylindrical view image comprises multiple rows of pixels and multiple columns of pixels, and wherein the generated cylindrical view image is generated by linearly distributing a horizontal camera opening angle of the camera over the columns of pixels; and
- wherein said trailer angle detection system determines an angle of the trailer relative to the vehicle responsive to determination of which columns of pixels the detected portion of the trailer appear at in the generated cylindrical view image.

16. The trailer angle detection system of claim 15, wherein the detected portion of the trailer is at the same height and at the same pixel row in the generated cylindrical view image when the trailer is at different angles relative to the vehicle.

17. The trailer angle detection system of claim 15, wherein the detected portion of the trailer is the same width and at the same pixel row in the generated cylindrical view image when the trailer is at different angles relative to the vehicle.

18. The trailer angle detection system of claim 15, wherein the horizontal band of the field of view of said camera comprises a single pixel row in the generated cylindrical view image.

19. The trailer angle detection system of claim 15, wherein said trailer angle detection system performs an initial calibration when the vehicle is initially moved when towing the trailer.

20. The trailer angle detection system of claim 15, wherein said trailer angle detection system determines the angle of the trailer without use or detection of a target on the trailer.

* * * * *